United States Patent [19]

DeMarse et al.

[11] 4,069,359

[45] Jan. 17, 1978

[54] MEANS AND METHOD OF SEPARATING LENGTHS OF FLATTENED FLEXIBLE POLYMERIC TUBE

[75] Inventors: Ernest W. DeMarse, Tallmadge; Michael M. Gozdiff, North Canton, both of Ohio

[73] Assignee: The Goodyear Tire & Rubber Company, Akron, Ohio

[21] Appl. No.: 696,164

[22] Filed: June 14, 1976

[51] Int. Cl.² ............... B65D 85/62; B65D 85/67; B65D 81/02
[52] U.S. Cl. .................... 428/36; 138/112; 206/412; 206/499; 206/516; 206/523; 206/526; 211/49 S; 214/1 P; 214/10.5 R; 242/7.22; 242/67.3 R; 428/192; 428/906
[58] Field of Search .............. 428/906, 36, 192; 242/7.21, 7.22, 54 A, 67.3 R; 206/412, 499, 516, 523, 526; 214/10.5 R, 1 P; 211/49 S; 138/112; 156/198

[56] References Cited

U.S. PATENT DOCUMENTS

| 2,506,058 | 5/1950 | Bossmeyer | 214/10.5 R |
| 2,822,096 | 2/1958 | Buratovich | 214/10.5 R |
| 3,015,385 | 1/1962 | Chesnut | 206/412 |
| 3,385,462 | 5/1968 | Deldime et al. | 214/10.5 R |
| 3,729,367 | 4/1973 | Shore et al. | 428/181 |
| 3,783,086 | 1/1974 | Plummer | 428/192 |
| 3,835,992 | 9/1974 | Adams | 206/499 |

*Primary Examiner*—William R. Dixon, Jr.
*Attorney, Agent, or Firm*—F. W. Brunner; R. P. Yaist; L. A. Germain

[57] ABSTRACT

A plurality of lengths of at least one flattened flexible polymeric tube disposed in superposed relation. Each length in cross section includes enlarged folded edge portions with a flat center portion between the edge portions. Means such as a separator or spacer having substantial thickness is inserted between or within the tube lengths to support the weight of at least a substantial part of the center portion of each length to prevent the formation of edge creases longitudinally along the edges of the tube lengths. The invention is particularly useful in the processing of uncured or unvulcanized rubber tubes either in a stacked or rolled condition.

30 Claims, 19 Drawing Figures

U.S. Patent  Jan. 17, 1978  Sheet 1 of 3  4,069,359
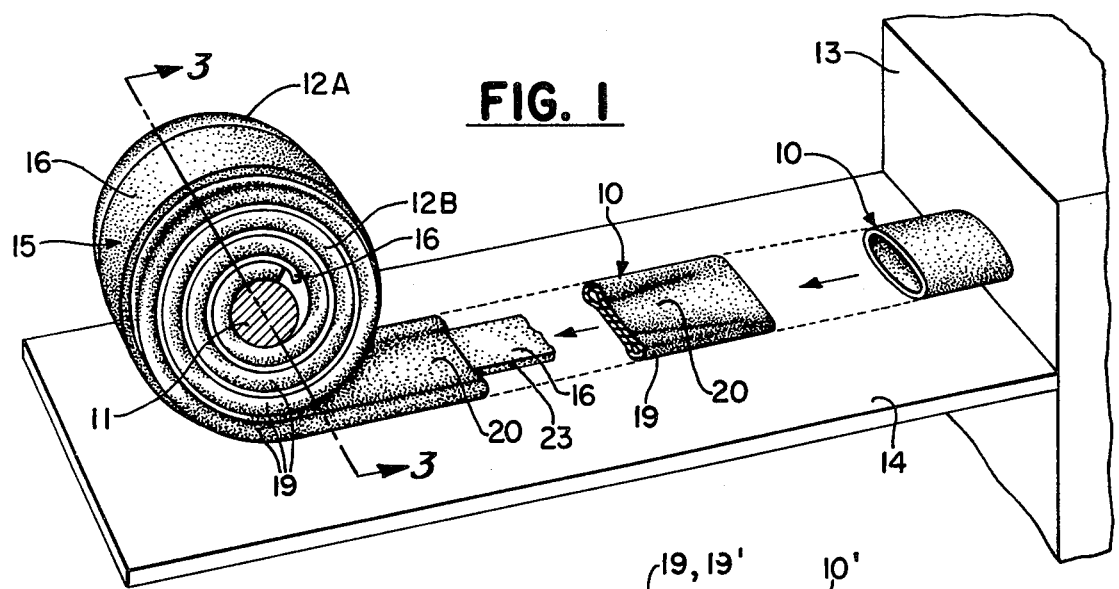
FIG. 1
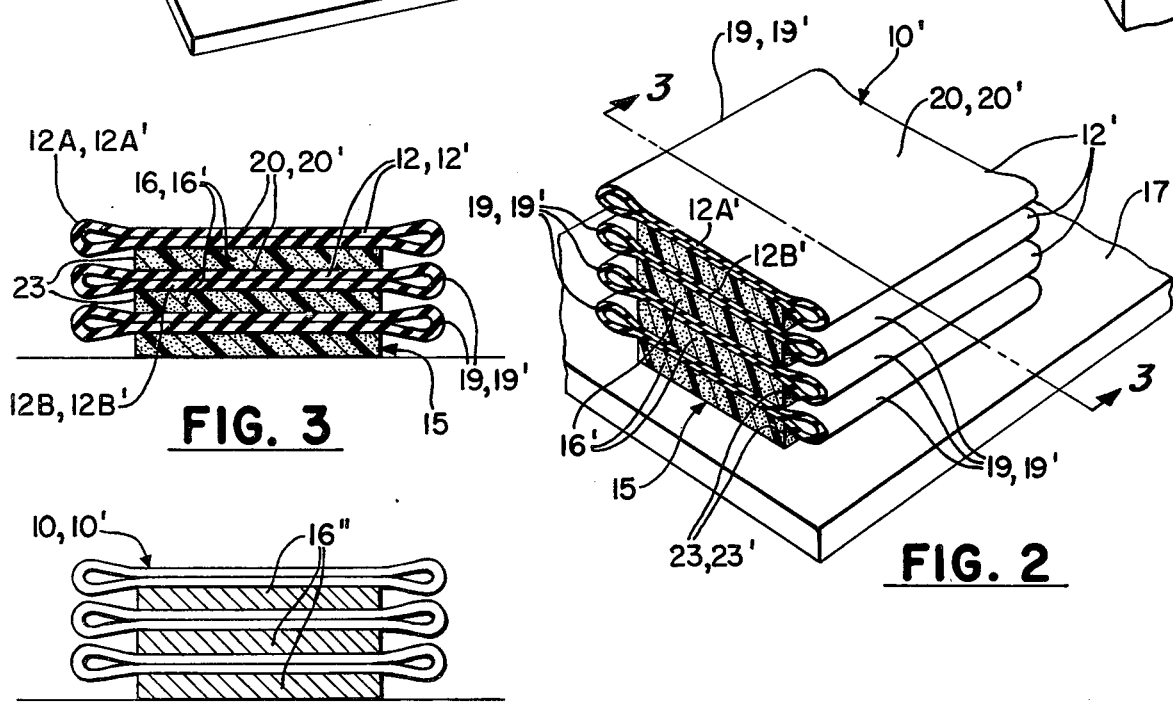
FIG. 3
FIG. 2
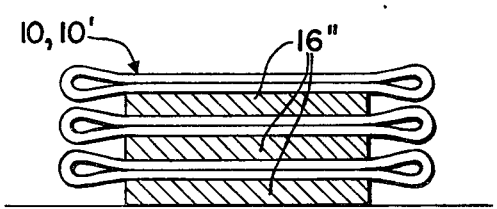
FIG. 4
FIG. 5
PRIOR ART
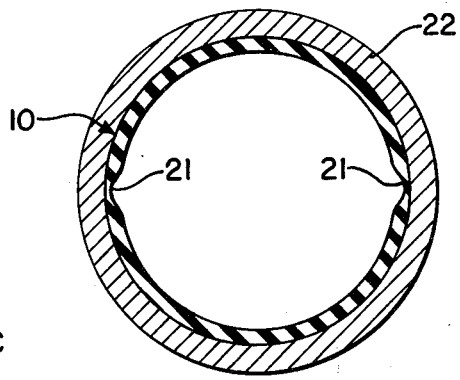
FIG. 6
PRIOR ART

MEANS AND METHOD OF SEPARATING LENGTHS OF FLATTENED FLEXIBLE POLYMERIC TUBE

BACKGROUND OF THE INVENTION

This invention relates to the processing of lengths of flattened flexible polymeric tubes. More particularly this invention relates to means for separating and supporting such lengths either in a stacked or rolled condition for storage or packing and shipment. This invention has specific relation to a method including the use of a separator or spacer for disposition either between or within lengths of uncured or unvulcanized rubbery polymeric tubes for the purpose of preventing the development of edge creases along the edges of the tube lengths.

Those skilled in the art are aware that in the handling of flexible polymeric tubes and particularly uncured or unvulcanized rubber tubes a problem has existed when such tubes are stacked or wound around a cylindrical core or shell while in a flattened condition. This problem relates to the development or formation of edge creases in the enlarged folded edge portions of the tube lengths extending along the longitudinal edges thereof. These edge creases result in a longitudinal thinned out portion which often detrimentally affects the usefulness of the tube. For example, when such tubes are used in lining pipe a thinned out portion may be created in the creased area during inflation of the tube in the pipe or jacket. This same condition can exist when the tube is positioned over a mandre for example, during a hose manufacturing process.

It is assumed that the edge creases are caused by the extra pressure which is created when the tube lengths are stacked or wound upon each other. Previously it has been the practice either to allow each successive tube length to lie directly on the length immediately therebelow or to separate these lengths only by a relatively thin film for example, of polyethylene or holland cloth to essentially prevent adherence of the unvulcaized rubbery polymeric material.

It has been found that the foregoing disadvantages can be overcome by the present invention which will be hereinafter described.

OBJECTS OF THE INVENTION

It is a primary object of the present invention to provide means for significantly reducing or eliminating the development of edge creases in lengths of flattened flexible polymeric tubes disposed in a superposed relation.

It is another primary object of the present invention to provide means for separating and supporting lengths of such polymeric tubes and particularly uncured or unvulcanized rubbery polymeric tubes of the type described to prevent the development of edge creases longitudinally along the edges of the tube lengths.

It is another important object of the present invention to provide a separator or spacer of improved edge construction which will accommodate the enlarged folded edge portions of flattened polymeric tubes of the type described.

It is also an object of the present invention to provide a method of reducing or eliminating longitudinal edge creases in superposed lengths of unvulcanized flattened tubes of flexible polymeric material.

Other objects and advantages of this invention will become apparent hereinafter as the description thereof proceeds, the novel features, arrangements and combinations being clearly pointed out in the specification as well as the claims thereunto appended.

It has been found in accordance with the present invention that the before mentined objects can be accomplished by the present invention wherein a plurality of lengths of at least one flattened flexible polymeric tube is disposed in superposed relation with each length in cross section including enlarged folded edge portions with a flat center portion therebetween. Thus each length has a substantially elongated dumbbell configuration. The improvement comprises means, having substantial thickness in relation to the single wall thickness of the tube, supporting the weight of at least a substantial part of the center portion of each length. This provides a bearing surface to distribute the weight of each length over at least a substantial part of the flat center portion of the length disposed immediately therebelow and away from the edge portions thereof to thereby prevent the formation of edge creases longitudinally along the edges of the tube lengths.

The means may be disposed between each length of tube to thereby provide external support therefor or the means may be disposed within each length of tube to thereby provide internal support therefor.

The above-mentioned objects are also accomplished by providing a separator of flexible material for use as load bearing means between lengths of extruded tubes of unvulcanized rubber with one length of tube being superposed over another length. The tube has a flattened central section and enlarged folded edges of a generally bulbular configuration. The separator has a substantial width and thickness in relation to the tube and is adapted to provide support for the central section thereof to thereby distribute the weight of each length of tube over the central section to relieve pressure on the folded edges thereof.

The objects and advantages of the present invention are further achieved by a method of reducing or eliminating longitudinal edge creases in tubes of the type described wherein the method comprises supporting at least a part of the center portion of one length of tube and distributing the weight of that length over the center portion of the length disposed immediately therebelow and away from the edge portions thereof.

The separator is preferably at least one web or member comprised of a flexible volume compressible material such as a closed cel polyethylene foam.

BRIEF DESCRIPTION OF THE DRAWINGS

FIG. 1 is a perspective view of a typical use of the invention in which continuous lengths of an uncured rubbery polymeric tube are wound on a shell with parts being broken away to more clearly disclose the separator means of the invention;

FIG. 2 is a perspective view showing another use of the invention in which discrete lengths of an uncured rubber polymeric tube are stacked in superposed relationship having separators inserted between each length;

FIG. 3 is an enlarged section taken on line 3—3 of FIGS. 1 and 2;

FIG. 4 is a modification of the invention shown in FIG. 3;

FIG. 5 is a view similar to FIGS. 3 and 4 showing the cross sectional configurations of lengths of tube of the prior art in which no separator means is used;

FIG. 6 is a fragmentary end view showing a pipe lined with the prior art tube of FIG. 5;

DESCRIPTION OF THE PREFERRED EMBODIMENTS

Figure 7:
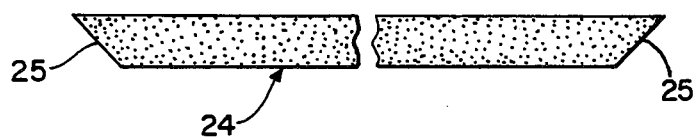
FIGS. 7-12 are modifications of the invention shown in FIG. 3 in which the separator has various improved edge constructions.

Referring now to the drawings, in FIG. 1 a typical arrangement is disclosed illustrating a preferred use of the invention. An uncured or unvulcanized flattened rubbery polymeric tube 10 is wound around a central cylindrical core or shell 11 with the tube 10 being comprised of a plurality of lengths 12 disposed in superposed relation. For the purposes of this invention it is to be understood that the tube may be comprised not only of natural or synthetic elastomers but other polymers of a flexible nature such as flexible plastics or thermoplastics which are not cured or vulcanized by cross-linking.

The tube 10 can be continuous and comprised of successive lengths 12 with one length 12A wrapped around the length 12B disposed immediately therebelow. For example, the tube 10 can be extruded from an extruder 13 onto a supporting surface such as a run out table 14 where it assumes a generally flattened condition. The tube 10 is then wound or wrapped around the shell 11 with one length 12A of tube being superposed over another length 12B. In accordance with the present invention means 15, for example, in the form of a continuous flexible spacer or separator member 16 is provided between the tube lengths 12 as the tube 10 is wound or coiled on the shell 11.

As shown in FIG. 2 in another typical arrangement illustrating the use of the invention separate discrete lengths 12' of the tube 10' are stacked on a supporting structure such as a pallet 17 with one length 12A' being superposed over the length 12B' disposed immediately therebelow. Means 15 are again provided as in the arrangement shown in FIG. 1 to separate the lengths 12' preferably in the form of separate individual spacers or separators 16' of flexible material.

The separator means 15 is preferably at least one member or web comprised of a flexible volume compressible material such as a closed cell, low density, polyethylene foam. In regard to the arrangement of the invention shown in FIGS. 1 and 3 the separator is preferably a continuous flexible web disposed between each length of the tube. Whereas in regard to the arrangement shown in FIGS. 2 and 3 the separator means 15 can be a plurality of separate individual flexible members 16 disposed or inserted between each length of tube 12. Also as illustrated in FIG. 4 the members 16" may also be rigid for instance, comprised of metal or rigid plastic.

The function of the separator or spacer 16, 16' of the invention is best shown in FIG. 3. The tube lengths 12, 12' in cross section include enlarged folded edge portions 19, 19' with a flat center portion 20, 20' therebetween. Thus each length 12, 12' has a substantially elongated dumbbell or bulbular configuration. The separator 16, 16' has a substantial thickness in relation to the single wall thickness of the tube 10, 10' and thereby supports the weight of at least a part of the center portion 20, 20' of each length 12, 12'. In this way a bearing surface is provided to distribute the weight of each length 12A, 12A' over at least a part of the flat center portion 20, 20' of the length 12B, 12B' disposed immediately therebelow and away from the edge portions 19, 19' thereof. This prevents or at least significantly reduces the possibility of the formation of edge creases longitudinally along the edges 19, 19' of the tube lengths 12, 12'.

In the prior art without the use of means such as the separator or spacer member edge creases have readily developed along the edges 19 of the lengths 12 of tube 10, due to the edge pressure resulting from the weight of the folded edge portions 19. As illustrated in FIG. 5 edge creases developed particularly in the lengths 12B and 12C disposed below lengths 12A. As a consequence when such unvulcanized tubes 10 were used for example, as a pipe lining a longitudinal thinned out portion 21 developed in the tube 10 when the tube was inflated in a pipe or jacket 22 or when placed over a mandrel as part of a hose manufacturing process. This condition of the prior art is illustrated in FIG. 6.

The separator or spacer 16, 16' preferably has a thickness which is at least about 50% or one half of the single wall thickness of the tube 10, 10'. It has been found that the most desirable results are obtained when the thickness of the separator 16, 16' is from about 75 to about 150% of the single wall thickness of the tube 10, 10'. It has been determined in this regard that when the thickness of the separator is substantially less than 75% of the single wall thickness of the tube the edge cushioning characteristics are reduced and that any thickness substantially in excess of 150% achieves no significant improvement in the functioning of the invention. Even more preferably the separator should have a thickness which is from about 100 to about 150% of the single wall thickness of the tube. Typically the tube may have a single wall thickness of 6.4 mm (¼ inch) with the separator having a thickness of from about 6.4 to about 9.5 mm (¼ to ⅜ inch).

The separator may take various forms and configurations, for example, the separator means may be at least one member 16, 16' of substantially uniform cross section co-extensive with the center portion 20, 20' of the tube 10, 10' but terminating short of the edge portions 19, 19' as illustrated in FIGS. 3 and 4 of the invention. In this concept of the invention it is preferred that each member include opposite lateral edge portions 23, 23' each of which terminate from about 19 to about 38 mm (¾ to 1-½ inches) from the lateral edges of the flattened tube. It is to be understood, however, that these distances can vary depending upon the nature of the polymeric material of the tube. If the tube is comprised of material of a relative stiff or rigid nature the edge portions of the member may terminate at a farther distance from the lateral edges of the tube. By the same token if the material of the tube is relatively soft and pliable the member may be disposed with its edges at a closer distance to the lateral edges of the tube.

Also in regard to this concept of the invention, it has been discovered that more satisfactory results are achieved when the member 24 includes lateral edge portions 25 which are tapered outwardly as shown in FIG. 7. It is preferred that the edge portions be tapered at an angle of from about 15° to about 90° as measured with respect to the transverse center line of the web. The exact angle of taper will be dependent largely upon the type and nature of the polymeric or elastomeric material of the tube. Generally, the softer and more deformable the material of the tube the smaller the angle of taper need be. For example, the edge portion of the member should have a bevel or taper of at least 45° for optimum results when used to separate typical rubber tubes having a Shore A durometer hardness of from about 30 to about 50.

Figures 8, 9:
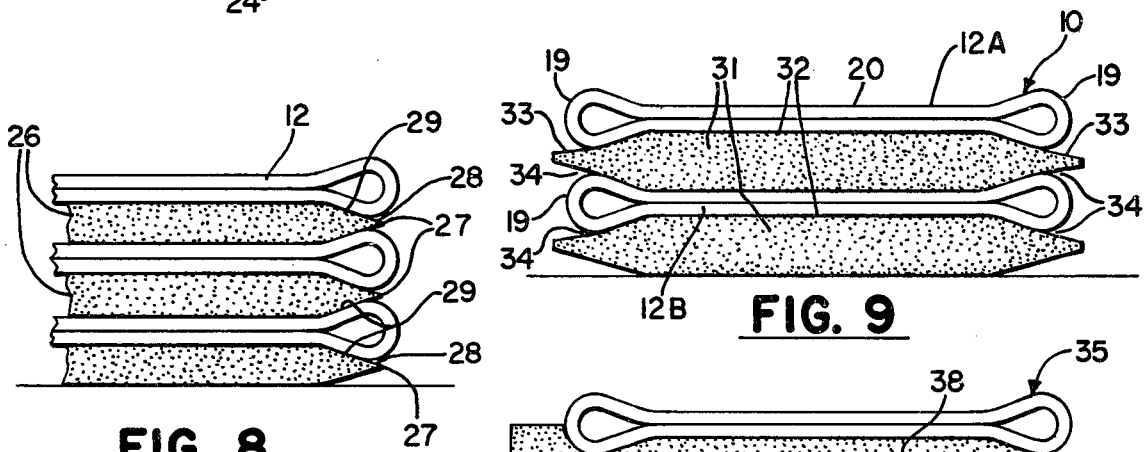

It is in fact most preferred as shown in the arrangement of FIG. 8 that each member 26 includes lateral edge portions 27 which are tapered inwardly and outwardly at a substantially equal angle. In this way each tapered surface 28 thus formed contacts one edge portion 29 of a length 12 of the tube thereby providing a more desirable cross sectional configuration to attain the ends of the invention.

In another concept of the invention the separator means is at least one member having a width greater than the width of the flattend tube as shown in FIGS. 9-12. In these instances the separator includes a center portion of substantially uniform cross section in alignment with the center portion of the length of the flattened tube and opposite edge portions adapted to receive the enlarged edge portions of the tube.

For example, as illustrated in FIG. 9 each member 31 includes a center portion 32 which is in alignment with the center portion 20 of the length of tube 12 and opposite lateral edge portins 33 which are extensions of the center portion 32. The lateral edge portions 33 have a thickness less than the thickness of the center portion 32 with a space 34 thereby being provided between each length of tube 12A and 12B to receive the enlarged edge portions 19 of the tube 10.

Figure 10:
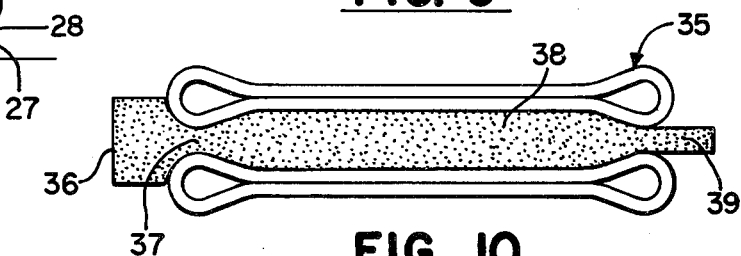

FIG. 10 further illustrates that the member 35 may include at least one lateral edge portion 36 of a generally T-shaped configuration with the middle leg 37 of the T being disposed horizontally and connected to the center portion 38 but having a thickness less than the thickness of the center portion 38. The other lateral edge 39 may be shaped similarly to the lateral edges of the members shown in FIG. 9.

Figure 11:
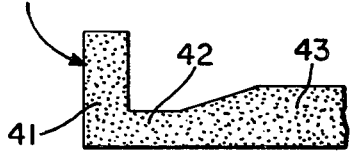

The lateral edges of the member of the invention can also take other forms or configurations such as being L-shaped as illustrated in FIG. 11. In this instance, the member or separator 40 includes at least one edge 41 of an L-shaped configuration. The horizontal leg 42 of the L is connected to the center portion 43 and has a thickness less than the thickness of the center portion 43.

Figure 12:
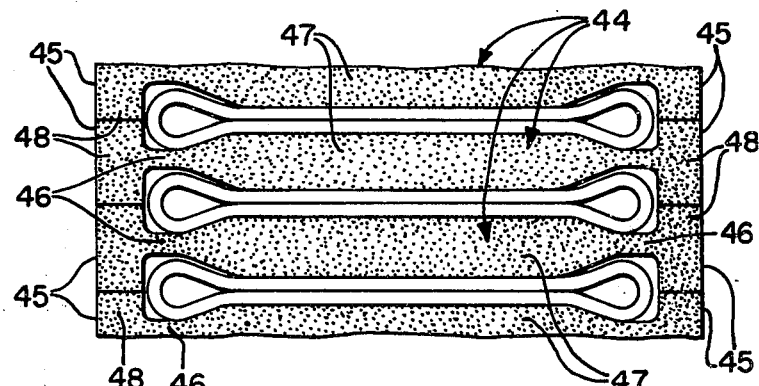

In FIG. 12 a modification of the invention shown in FIG. 10 is illustrated in which each member 44 includes opposite lateral edge portions 45 of a generally T-shaped configuration. The middle leg 46 of the T is disposed horizontally and connected to the center portion 47 and has a thickness less than the thickness of the center portion 47. Each of the vertically disposed legs 48 of the T may be positioned or arranged in an abutting end to end relationship. With this arrangement a supporting structure for the tube is defined upon which the tube can be wound or supported eliminating the necessity of a shell.

In another basic concept of the invention the means for supporting the center section of the lengths of tube is disposed or inserted within each length of tube rather than between each such length to thereby provide internal support for the tube. This concept is illustrated in connection with FIGS. 13 and 15-17.

Figure 13:
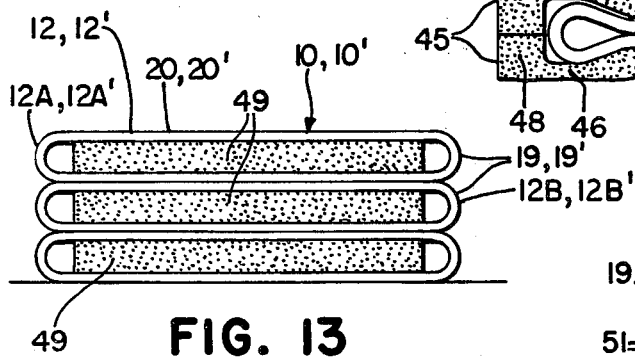
FIG. 13 is a modification of the invention shown in FIG. 3 in which the separator is disposed within the tube length.

For example, in the arrangement shown in FIG. 13 a plurality of spacer or separator members 49 are disposed within the lengths 12 of unvulcanized tube 10 which are disposed in superposed relationship by being either stacked or coiled as previously discussed. It should be apparent that the use of an internal separator is more appropriate in the case of processing short, discrete lengths of tube than in processing a continuous length of tube as when the tube is in a coiled condition. The members or inserts 49 again have a substantial thickness in relation to the single wall thickness of the tube 10, 10′ and support the weight of at least a part of the center portion 20, 20′ of each length 12, 12′ of tube and thereby provide a bearing surface to distribute the weight of each length 12A, 12A′ over at least a part of the flat center portion 20, 20′ of the length 12B, 12B′ disposed immediately below. Therefore, the weight is distributed away from the edge portions 19, 19′ of the tubes 10, 10′ to prevent the formation of edge creases longitudinally along the edges of the tube lengths 12, 12′.

Figure 14:
FIG. 14 is a view similar to FIG. 13 showing a cross sectional configuration of a single length of tube of the prior art in which no internal support is provided.

In the prior art as shown in FIG. 14 when a single length of unvulcanized rubber tube 10, 10′ is laid on a flat supporting surface 17 without internal support its lateral folded edges 19 assume a generally bulbular configuration which become susceptible to creasing. This is especially true with the additional weight of other lengths of tube either stacked one on the other or coiled.

Figure 15:
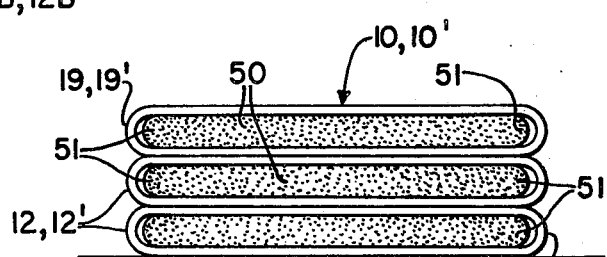
FIGS. 15-17 are modifications of the invention shown in FIG. 13.

The internal separator 49 may have various edge configurations in addition to the polygonal or rectilinear configuration as shown in FIG. 13. For example, as illustrated in FIG. 15 the members 50 may have generally curvilinear or rounded edges 51 which are similar in contour to the inside surfaces of the edges 19, 19′ of the length 12, 12′ of the tube 10, 10′.

Figure 16:
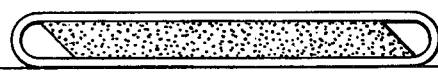
Figure 17:
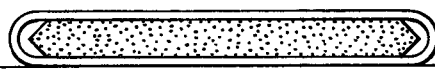

The edge portions of the separator member, of course, may be of other configurations such as being tapered inwardly or outwardly as shown in FIG. 16 or having a double tapered configuration as shown in FIG. 17.

The method of the invention, therefore, includes supporting at least a part of the center portion of one length of the tube of the type described and distributing the weight of that length over the center portion of the length disposed immediately therebelow and away from the edge portions thereof. The method of the invention may be illustrated more particularly in regard, for example, to the use of the invention shown in FIG. 1 by reference to FIGS. 18 and 19.

Figure 18:
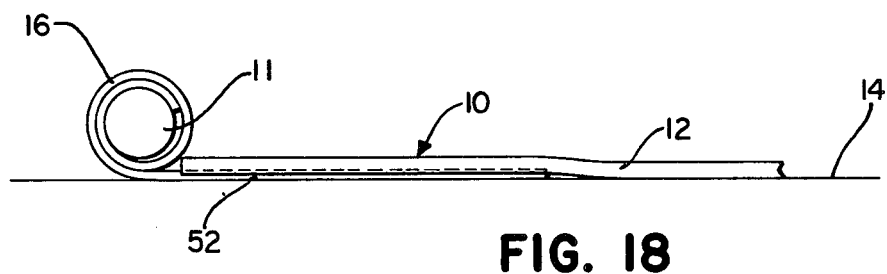
FIGS. 18 and 19 show steps in the method of the invention in which the tube lengths are wound on a shell as illustrated in FIG. 1.
Figure 19:
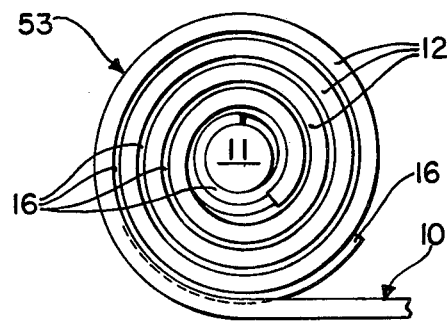

In FIG. 18 it is shown that the method of the invention includes winding a portion of a continuous web 16 of flexible material for example, a closed cell low density polyethylene foam, around a cylindrical core 11 and leaving a portion 52 of the web in an extended condition on the supporting surface 14. Then a length 12 of the extruded tube having a greater width than the width of the web 16 is laid over the extended portion 52 of the web. The tube 10 and web 16 are wound around the core 11 to form a roll or coil 53 as shown in FIG. 19 in which each successive length 12 of the tube 10 is separated and supported by the web 16. If desired, as in the case wherein unvulcanized tubes of particularly tacky rubbery polymeric compounds are being processed, a thin film of polyethylene and preferably an embossed polyethylene (not shown) is first wrapped or wound around the core to prevent the edges of the tube lengths from sticking together. The same effect may also be achieved by the use of a suitable dusting material or solution well known in the art such as zinc sterate or silicone.

While certain representative embodiments and details have been shown for the purpose of illustrating the invention, it will be apparent to those skilled in this art that various changes and modifications may be made therein without departing from the spirit or scope of the invention.

What is claimed is:

1. In combination with a plurality of lengths of at least one flattened flexible polymeric tube disposed in superposed relation, each said length in cross-section including enlarged folded edge portions with a flat center portion therebetween each length thereby having a substantially elongated dumbbell configuration, a cellular polymeric foam separator having substantial thickness in relation to the single wall thickness of the tube, supporting the weight of at least a substantial part of the center portion of each said length to provide a bearing surface to distribute the weight of each said length over at least a substantial part of the flat center portion of the length disposed immediately therebelow and away from the edge portions thereof to thereby prevent the formation of edge creases longitudinally along the edges of the tube lengths.

2. The invention as claimed in claim 1 wherein said separator has a thickness which is at least 50% of the single wall thickness of said tube.

3. The invention as claimed in claim 1 wherein said separator is disposed between each said length of tube to thereby provide external support therefor.

4. The invention as claimed in claim 1 wherein said separator is disposed within each said length of tube to thereby provide internal support therefor.

5. The invention as claimed in claim 1 wherein said tube is comprised of separate discrete lengths of uncured rubbery polymeric material with one length superposed over the length disposed immediately therebelow.

6. The invention as claimed in claim 1 wherein said tube is continuous and comprised of successive lengths of uncured rubbery polymeric material with one length wrapped around the length disposed immediately therebelow.

7. The invention as claimed in claim 2 wherein said means is at least one web comprised of a flexible volume compressible material.

8. The invention as claimed in claim 3 wherein said separator comprises at least one separating member of substantially uniform cross-section coextensive with said center portion but terminating short of said edge portions.

9. The invention as claimed in claim 3 wherein said separator comprises at least one member having a width greater than the width of said flattened tube and includes a center portion of substantially uniform cross-section in alignment with the center portion of a length of said flattened tube and opposite edge portions adapted to receive the enlarged edge portions of said tube.

10. The invention as claimed in claim 4 wherein said separator comprises a plurality of members each having generally polygonal lateral edges.

11. The invention as claimed in claim 4 wherein said separator comprises a plurality of members each having generally curvilinear lateral edges.

12. The invention as claimed in claim 5 wherein said separator comprises rigid closed-cell foam.

13. The invention as claimed in claim 5 wherein said separator is flexible and has a thickness of from about 75 to about 150% of the single wall thickness of said tube.

14. The invention as claimed in claim 6 wherein said separator is flexible and has a thickness of from about 75 to about 150% of the single wall thickness of said tube.

15. The invention as claimed in claim 7 wherein said flexible separator comprises a closed cell volume-compressible polyethylene foam.

16. The invention as claimed in claim 8 wherein each said separating member includes opposite lateral edge portions each of which terminate from about 19mm to about 38mm ($\frac{3}{4}$ to $1\frac{1}{2}$ inches) from the lateral edges of said tube.

17. The invention as claimed in claim 8 wherein each said separating member includes lateral edge portions which are tapered outwardly.

18. The invention as claimed in claim 8 wherein each said separating member includes lateral edge portions which are tapered inwardly and outwardly at a substantially equal angle with each tapered surface formed thereby contacting one edge portion of a length of said tube.

19. The invention as claimed in claim 9 wherein each said separating member includes opposite lateral edge portions which are extensions of said center portion and have a thickness less than the thickness of said center portion with space thereby being provided between each length to receive the enlarged edge portions of said tube.

20. The invention as claimed in claim 9 wherein each said separating member includes at least one lateral edge portion of a generally T-shaped configuration with the middle leg of the T being disposed horizontally and connected to said center portion and having a thickness less than the thickness of the center portion.

21. The invention as claimed in claim 9 wherein each said separating member includes at least one lateral edge portion of an L-shaped configuration with the horizontal leg of the L being connected to said center portion and having a thickness less than the thickness of said center portion.

22. The invention as claimed in claim 14 wherein said separator comprises a continuous flexible web disposed between each length of said tube.

23. The invention as claimed in claim 17 wherein said edge portions are tapered at an angle of from about 15° to about 90° as measured with respect to the transverse centerline of said web.

24. The invention as claimed in claim 20 wherein said separating member includes one said edge portion of said T-shaped configuration and one lateral edge portion having a thickness less than the thickness of said center portion.

25. The invention as claimed in claim 20 wherein each said separating member includes opposite lateral edge portions of said T-shaped configuration with each of the vertical disposed legs of the T being arranged in an abutting end-to-end relationship thereby defining a supporting structure for said tube.

26. The invention as claimed in claim 22 wherein said web is comprised of a closed cell, volume compressible, low density polyethylene foam.

27. A separator of, cellular, polymeric flexible material for use as load-bearing means between lengths of extruded tube of unvulcanized rubber with one length of tube being superposed over another said length, said tube having a flattened central section and enlarged folded edges of a generally bulbular configuration, said separator having a substantial width and thickness in relation to said tube and being adapted to provide support for said central section thereof to thereby distribute the weight of each said length of tube over said central section to relieve pressure on the folded edges thereof.

28. A method of reducing or eliminating longitudinal edge creases in superposed lengths of flattened tubes of flexible polymeric material including enlarged edge portions and a flattened center portion therebetween, said method comprises inserting a flexible, volume-compressible polymeric separator between the superposed lengths of flattened tubes to support at least a part of said center portion of one said length of tube and distribute the weight of that said length over the center portion of the length disposed immediately therebelow and away from the edge portions thereof.

29. The method as claimed in claim 28 comprising inserting a substantial thickness of separator within each said length of said tube.

30. The method as claimed in claim 28 wherein said separator is a continuous flexible member and said method comprises:
   winding a portion of the continuous member around a cylindrical core and leaving a portion thereof in an extended condition;
   laying a length of said tube over the extended portion of said continuous member; and
   winding said tube and said member around said core to form a roll in which each successive length of said tube is separated and supported by said member.

* * * * *